United States Patent [19]

Grabscheid et al.

[11] Patent Number: 5,846,173
[45] Date of Patent: Dec. 8, 1998

[54] ANTI-DEFLECTION ROLL

[75] Inventors: Joachim Grabscheid, Heuchlingen; Christian Schiel, Heidenheim, both of Germany

[73] Assignee: Voith Sulzer Papiermaschinen GmbH, Heidenheim, Germany

[21] Appl. No.: 837,471

[22] Filed: Apr. 18, 1997

[30] Foreign Application Priority Data

Apr. 26, 1996 [DE] Germany ................ 196 16 802.3

[51] Int. Cl.⁶ .................................................. B21B 13/02
[52] U.S. Cl. ........................... 492/7; 492/2; 492/16
[58] Field of Search ........................... 492/7, 1, 2, 3, 492/6, 16, 20, 17

[56] References Cited

U.S. PATENT DOCUMENTS

| | | |
|---|---|---|
| 4,404,724 | 9/1983 | Christ et al. . |
| 4,751,775 | 6/1988 | Kubik ........................................ 492/7 |
| 4,955,120 | 9/1990 | Brendel et al. ........................ 492/7 |
| 4,984,343 | 1/1991 | Schrörs ................................ 492/7 |
| 5,338,279 | 8/1994 | Schiel ................................... 492/7 |

FOREIGN PATENT DOCUMENTS

| | | |
|---|---|---|
| 2744524 | 11/1978 | Germany . |
| 2550366 | 1/1980 | Germany . |
| 3012732 | 10/1981 | Germany . |
| 3528333 | 2/1987 | Germany . |
| 4420104 | 12/1995 | Germany . |

*Primary Examiner*—Irene Cuda
*Attorney, Agent, or Firm*—Greenblum & Bernstein P.L.C.

[57] ABSTRACT

An anti-deflection roll including a rotating roll sleeve, a support member or yoke that extends along the axis of the roll sleeve or jacket, and a plurality of hydrostatic and/or hydrodynamic support units, partially positioned within the support member and arranged in a predetermined spaced relation to each other, to support the roll sleeve in an axial direction. Between an inner surface of the roll sleeve and a support surface of each support unit an intermediate fluid coating layer may be formed.

29 Claims, 3 Drawing Sheets

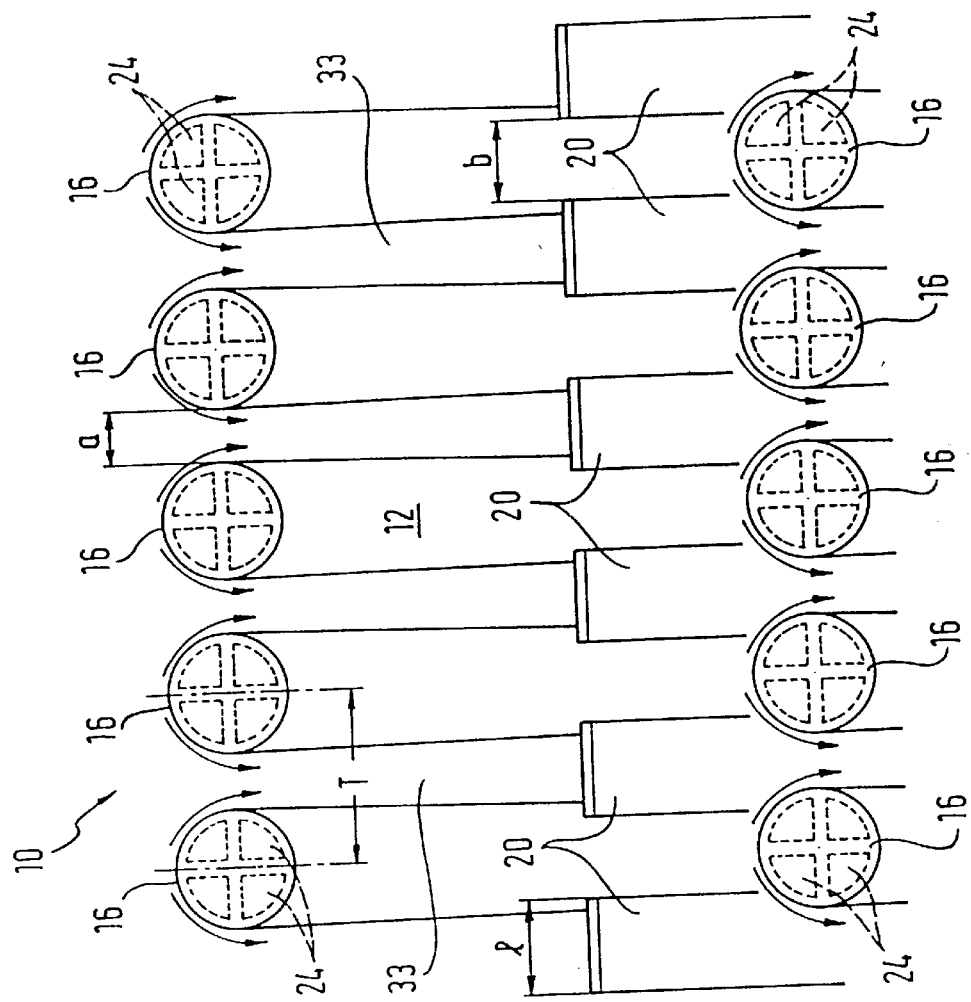
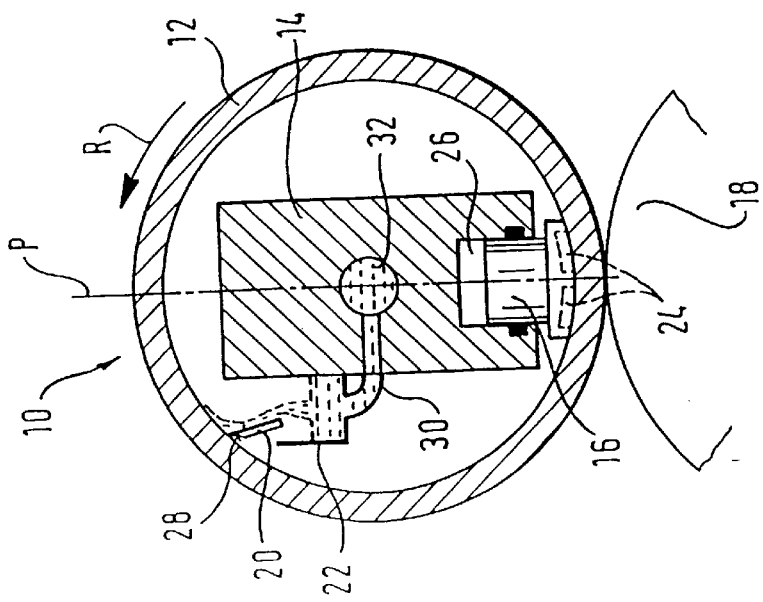

ANTI-DEFLECTION ROLL

CROSS-REFERENCE OF RELATED APPLICATION

The present invention claims the priority under 35 U.S.C. §119 of German Patent Application No. 196 16 802.3 filed on Apr. 26, 1996, the disclosure of which is expressly incorporated by reference herein in its entirety.

BACKGROUND OF THE INVENTION

1. Field of the Invention

The present invention relates to an anti-deflection roll including a rotating roll sleeve, a support member or yoke that extends along the axis of the roll sleeve or jacket, and a plurality of hydrostatic and/or hydrodynamic support units, partially positioned within the support member and arranged in a predetermined spaced relation to each other, to support the roll sleeve in an axial direction. Between an inner surface of the roll sleeve and a support surface of each support unit an intermediate fluid coating layer may be formed.

2. Background and Material Information

In a conventional anti-deflection roll, a fluid, e.g., oil, supplied through the support units has to be drawn off at least in part from an interior of the roll. When the anti-deflection roll is utilized as a bottom roll, the fluid is scraped from the inner surface of the roll sleeve by the upper support units and discharged with the aid of gravity. However, this is not possible when the anti-deflection roll is utilized as a top roll because the support units are located at the bottom of the inner surface of the roll. A system utilizing an anti-deflection roll used as upper roll has been discussed, e.g., in DE 25 50 366 A1, which discloses furnishing a dip ring between the support member and an end section of the roll sleeve.

In conventional anti-deflection rolls, it is particularly problematic that relatively thick oil rings, which are formed in the roll, result in high Plansch power losses, particularly in the flow around the support units.

SUMMARY OF THE INVENTION

An object of the present invention may be to create an anti-deflection roll of the above-discussed type, particularly when utilized as a top roll, in which an amount of fluid contained in the roll interior and the Plansch power losses may be reduced to a minimum a top roll, in a simple and reliable manner.

The object may be achieved in accordance with the present invention by utilizing a plurality of several fluid scraper units arranged along an inner circumferential surface of the roll sleeve along its axial length. The plurality of fluid scrapers may also be aligned with respect to predetermined gaps formed between the support units.

Each fluid scraper units may act specifically on a discrete fluid ring that may be formed by fluid carried along by the roll jacket that may eventually flood the support units. As a result, an amount of fluid in the roll interior may be reduced to a minimum so that a fluid film layer formed on the roll interior surface may be kept sufficiently thin. The Plansch power losses that occur, e.g., from flooding of support units, are also reduced. At the same time, abrasion losses may be minimized. These losses may be significantly lower than those associated with a continuous scraping blade.

In a preferred embodiment of the anti-deflection roll of the present invention, the axial length of each fluid scraper unit, which may be at least as long as the predetermined gap length between adjacent support units, and may preferably be, e.g., one-third of a space between centers of adjacent support elements. Further, each fluid scraper unit may be arranged along the axis of the roll sleeve to act on a portion of the interior surface formed between adjacent support units. Due to the discontinuous arrangement of the fluid scraper unit, abrasion losses may be reduced, e.g., to approximately one third of the losses occasioned by a continuous scraper blade.

When support units generate a fluid film thickness, e.g., of approximately 50 to 100 µm, at least a portion of the fluid scraper units may be advantageously arranged, shaped and/or pressurized to allow a fluid film thickness of approximately 10 to 100 µm to pass through.

It may also be advantageous to at least partially arrange, shape and/or pressurize the fluid scraper units to be effective only when the anti-deflection roll acts as top roll. Thus, when the fluid scraper units are located in an upper half of the roll they may be automatically positioned in an active state and, yet, be in an ineffective state when the anti-deflection roll is utilized as a bottom roll, i.e., the scraper unit is located in a bottom half of the roll.

When the anti-deflection roll is utilized as bottom roll, the support units may act as the fluid scraper units.

Since, as a conventional rule, different rotational directions of the roll sleeve may result from using the anti-deflection roll as a top or a bottom roll within the same machine, the fluid scraper units may be arranged, shaped and/or pressurized to be operational only in one rotational direction of the roll sleeve and to be ineffective in the opposite rotational direction of the roll sleeve.

The support units may be configured such that they may be effectively flooded with fluid when the roll sleeve, e.g., used as top roll, rotates in one direction and may be utilized to effectively scrape the fluid off the interior of the roll sleeve when the roll sleeve turns in the opposite direction.

Should, e.g., the anti-deflection roll of the present invention be utilized as top roll for two sister machines in a mirror-inverted arrangement, a first and second row of axially arranged fluid scraper units may be arranged, shaped and/or pressurized so that the fluid scraper units forming the first row may only be effective when the roll sleeve rotates in a first direction, while the scraper units associated with the second row may only be effective when the roll sleeve turns in a second, i.e., opposite the first, direction.

However, it is also conceivable that at least a portion the fluid scraper units may be effective in both rotational directions of the roll sleeve.

In one preferred embodiment, at least one fluid reservoir or receptacle may be associated with the fluid scraper units for gravity-assisted fluid removal. Thus, relatively complex fluid suction removal becomes unnecessary.

The present invention may be directed to an anti-deflection roll that may include a support member including a plurality of support devices, a roll sleeve having a rotational axis rotatably supported by the plurality of support devices, and the plurality of support devices may be spaced to form a gap having a predetermined gap distance between adjacent support devices and arranged substantially parallel to the rotational axis. A plurality of fluid scraping devices may be positioned adjacent to an inner surface of the roll sleeve, and each fluid scraping device may be circumferentially spaced from the support devices and associated with a respective gap between adjacent support devices.

According to another feature of the present invention, each fluid scraping device may include a length greater than or equal to the gap distance.

According to another feature of the present invention, the roll may also include a fluid reservoir for receiving the fluid from the fluid scraping device, a central channel formed in the support member and coupled to a fluid drain, and a fluid channel coupling the reservoir and the central channel.

According to still another feature of the present invention, each fluid scraping device may be arranged such that rotation of the roll sleeve in a first direction enables scraping of the fluid from the inner surface of the roll sleeve and that rotation of the roll sleeve in a second direction disables scraping of the fluid.

According to a further feature of the present invention, at least one fluid scraping device may be coupled to a lever having a first and second arm, the first arm may be coupled to the at least one fluid scraping device, the second arm may bias the at least one fluid scraping device toward the inner surface when the second arm is positioned below the first arm, and the second arm may bias the at least one fluid scraping device to a predetermined distance from the inner surface when the second arm is positioned above the first arm.

According to still another feature of the present invention, the lever may rotate about a pivot substantially parallel to the rotational axis. Alternatively, the lever may rotate about a pivot substantially perpendicular to the rotational axis.

According to a still further feature of the present invention, at least one fluid scraping device may be coupled to a rod biased by a spring and the spring may exert a predetermined spring force on the at least one fluid scraping device to position the at least one scraping device adjacent the the inner surface.

According to another feature of the present invention, at least one fluid scraping device may be coupled to a piston/cylinder device for biasing the at least one scraper device adjacent the inner surface.

According to still another feature of the present invention, the cylinder/piston device may further include a spring for exerting a predetermined spring force opposing the actuation of the piston.

According to a further feature of the present invention, the plurality of fluid scraping devices may include a first and second row of fluid scraping devices arranged substantially parallel to the rotational axis.

According to yet another feature of the present invention, the fluid scraping devices associated with the first row may be actuated by rotation of the roll sleeve in a first direction and the fluid scraping device associated with the second row may be actuated by rotation of the roll sleeve in a second direction.

Other exemplary embodiments and advantages of the present invention may be ascertained by reviewing the present disclosure and the accompanying drawing.

BRIEF DESCRIPTION OF THE DRAWINGS

The present invention may be further described in the detailed description which follows, in reference to the noted plurality of drawings by way of non-limiting examples of preferred embodiments of the present invention, in which like reference numerals represent similar parts throughout the several views of the drawings, and wherein:

FIG. 1 illustrates a simplified schematic sectional view of an anti-deflection roll utilized as top roll in accordance with the present invention;

FIG. 2 illustrates a top "unrolled" view of an inner circumferential surface of roll sleeve of the anti-deflection roll displayed in FIG. 1;

DETAILED DESCRIPTION OF THE PREFERRED EMBODIMENTS

Figure 3:
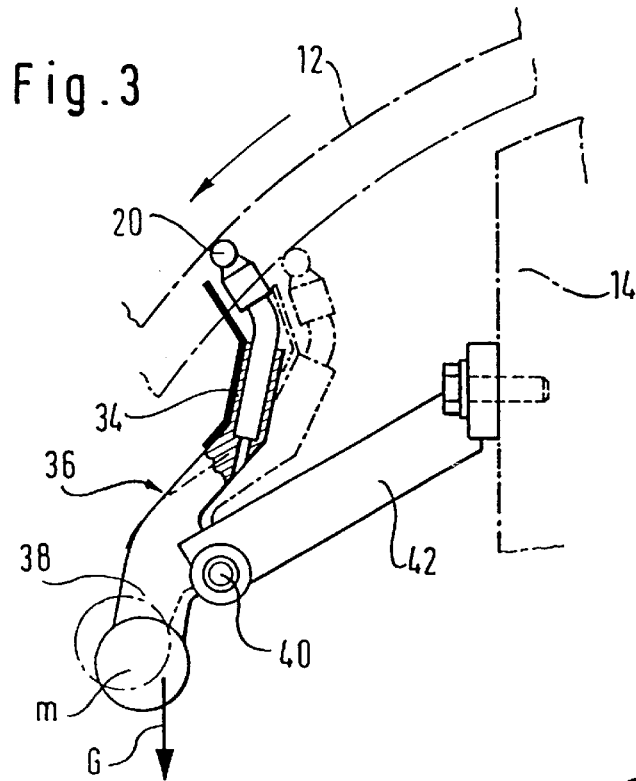
FIG. 3 illustrates an embodiment of a fluid scraper unit according to the present invention that uses the aid of gravity to press against the inner surface of the roll sleeve.

The particulars shown herein are by way of example and for purposes of illustrative discussion of the preferred embodiments of the present invention only and are presented in the cause of providing what is believed to be the most useful and readily understood description of the principles and conceptual aspects of the invention. In this regard, no attempt is made to show structural details of the invention in more detail than is necessary for the fundamental understanding of the invention, the description taken with the drawings making apparent to those skilled in the art how the invention may be embodied in practice.

FIG. 1 illustrates a schematic sectional view of an anti-deflection roll 10 including a rotating roll sleeve or jacket 12, a support member or yoke 14 that extends along the entire axis of roll sleeve 12, and a plurality of hydrostatic and/or hydrodynamic support units 16 (see also FIG. 2), each positioned partially within support member 14, that may be spaced from each other in the axial direction by a predetermined distance a. The plurality of support units 16 support an inner surface of roll sleeve 12 and a fluid coating layer may be formed therebetween.

In this arrangement shown, roll sleeve 12 may be rigid and may be slidable with respect to support member 14, i.e., parallel to a pressure plane P running through support units 16 and the axis of the anti-deflection roll 10. The anti-deflection roll 10 may be advantageously used as top roll and, alternatively, may be used with equal advantage as a bottom roll 18.

A plurality of fluid scraper units 20 may distributed along an axial length of roll sleeve 12 and abutting the inner circumferential surface of roll sleeve 12. The scrapers may be arranged in a row parallel to the roll axis on a left side of support member 14, as shown in FIG. 1, and in an upper half of the roll.

As illustrated in FIG. 2, fluid scrapers 20 may be discontinuously arranged along the axial length of roll sleeve 12. A predetermined gap distance a may be maintained between each adjacent support unit 16 and a spacing T may be maintained between centers of adjacent support units 16. A predetermined distance b may be formed between each adjacent fluid scraper unit 20 and each fluid scraper unit 20 may have an length, in the axial direction, of 1. In accordance with the present invention, a and b may have different values. Each fluid scraper unit 20 may be arranged within, and preferably to overlap, predetermined gap distance a, i.e., length l may be selected to be greater than or equal to predetermined gap distance a, e.g., length l may be preferably approximately one-third spacing T. Further, scraper units 20 may be displaced, with respect to support units 16, e.g., by approximately one-half spacing T, which may also be greater than predetermined gap distance a formed between support units 16.

At least one fluid reservoir 22 may be located on side of support member 14 and may be associated with fluid scraper units 20 to facilitate gravity-assisted fluid removal.

Support units 16, which may be piston shaped, may be fitted with hydrostatic pockets 24 that are fed by a corresponding pressure chamber 26 to pressurize the respective support unit 16.

In a counterclockwise-rotation of roll sleeve 12, as depicted in FIG. 1 as rotational direction R, fluid may be carried along by the inner surface of roll sleeve 12 and may be scraped off by scraper units 20 and may be removed, with the aid of gravity, into fluid reservoir 22 positioned underneath fluid scraper units 20. Fluid reservoir 22 may be coupled to a channel 30, e.g., located in a bottom of reservoir 22, and to a central channel 32 within support member 14. In this manner, central channel 32 may be positioned to lie at a lower point than reservoir 22, thus, facilitating drainage of the fluid solely by hydrostatic pressure and/or gravity assistance. Accordingly, suction removal is generally not necessary in the present invention.

As shown in FIG. 2, one fluid scraper 20 may also be inserted between each axial end of roll sleeve 12 and a neighboring support unit 16. FIG. 2 also illustrates that the fluid scraper units 20 may act specifically on fluid rings 33 formed by the predetermined gap distances a between adjacent support units 16. Fluid rings 33 may extend only a little in the axial direction during roll rotation.

Only a very thin film thickness, e.g., approximately 50–100 μm, may leave support units 16. In this case, fluid scraper units 20 may be arranged, shaped and/or pressurized to allow a fluid film thickness of, e.g., approximately 10 to 100 μm to pass through on the inner circumferential surface of roll sleeve 12.

FIG. 3 illustrates an embodiment of fluid scraper unit 20 that may be mounted on an arm 34 of a two-armed lever 36. Fluid scraper unit 20 may be held against the inner circumferential surface of roll sleeve 12 with the aid of gravitational force G exerted on an opposite lever arm 38. As shown in the figure, as gravitational force G exerts a downward force, two-armed lever 36, which may be mounted through a joint 40 on a support arm 42 coupled to support member 14, rotates about joint 40 forcing fluid scraper unit 20 upward to abut the inner surface of roll sleeve 12. To achieve the optimal gravity-assisted pressure, an end of lever arm 38 may be equipped with an additional mass m.

FIG. 3 illustrates two different rotational positions of lever 36 which results from different displacement positions of roll sleeve 12 with respect to support member 14, i.e., shown in solid and dashed lines, respectively. When anti-deflection roll 10 used as a top roll, fluid scraper unit 20 may be continuously pressed into abutting engagement with the inner surface of roll sleeve 12. As shown in the figure, the engagement may be maintained independently of a position of roll sleeve 12 relative to support member 14.

If, however, roll shown is FIG. 3 is utilized as a bottom roll, mass m on the end of lever arm 38 causes fluid scraper unit 20 to pivot away from the inner surface of roll sleeve 12. Thus, when utilized as a bottom roll, fluid scraper unit 20 is advantageously rendered ineffective.

In the embodiment shown in FIG. 3, the rotational axis of the two-armed lever 36, i.e., joint 40, may run parallel to the roll axis.

Figure 4:
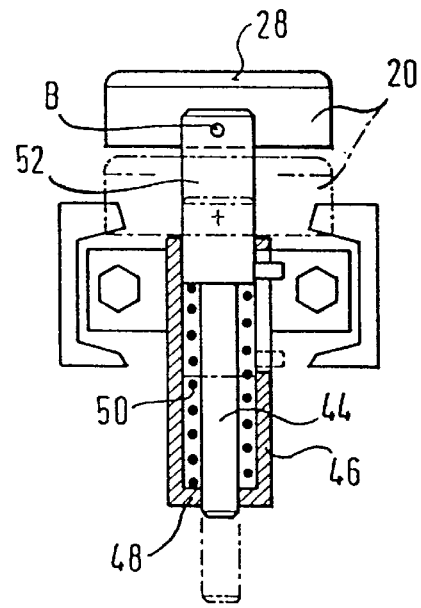
FIG. 4 illustrates an alternative embodiment of a scraper unit that is held against the inner surface of the roll sleeve with spring force.

FIG. 4 illustrates an alternative embodiment of fluid scraper unit 20, in which the scraper may be pressed against the inner surface of roll sleeve by a spring force. A blade-like fluid scraper unit 20 may be preferably coupled to a ram 44 to pivot around an axis B, e.g., substantially perpendicular to the roll axis. Ram 44 may be located within a guide bushing 46 having a bottom 48 that allows an end of ram 44, i.e., opposite fluid scraper unit 20, to penetrate therethrough. A pressure spring 50, which may slide onto ram 44 to bias the fluid scraper unit 20 away from guide bushing 46 and may be located within guide bush 46. Pressure spring 50 may be held in place by bottom 48 of guide bush 46 and by a widened attachment 52 coupled to ram 44. Further, blade-like scraper unit 20 may be mounted to widened attachment 52 to pivot around axis B. Pressure spring 50, thus, provides a predetermined pressing force on fluid scraper unit 20 against the inner surface of roll sleeve 12.

Blade-like fluid scraper units 20 may be easily tiltable with respect to pressure plane P toward the inner circumference of roll sleeve 12, e.g., as is shown in FIG. 1. An angle of inclination for fluid scraper unit 20 may be, e.g., approximately 33°.

Further, each fluid scraper unit 20 may include an inclined plane 28 positioned to face the inner surface of roll sleeve 12, i.e., to form a V groove between the inner circumferential surface of roll sleeve 12 and each fluid scraper unit 20 pressed against it. Thus, fluid scraper units 20 may only be effective for removing fluid when roll sleeve 12 rotates in one direction, e.g., direction R shown in FIG. 1, while fluid scraper units 20 may let the fluid pass by the scrapers due to a hydrodynamic effect generated by the V groove when roll sleeve 12 rotates in the opposite direction.

Anti-deflection roll 10, in accordance with the present invention, may be specifically utilized as a top roll. Thus, as roll sleeve 12 rotates in direction R, as shown in FIG. 1, fluid scraper units 20 may effectively remove fluid from the inner surface of roll sleeve 12. When roll sleeve 12 rotates in the direction opposite direction R, or when anti-deflection roll is utilized as a bottom roll, fluid scraper units 20 may let fluid pass through (or under the scraper) due to the hydrodynamic effect generated by the V groove between the inclined plane 28 and the roll sleeve 12.

If, as with the embodiment shown in FIG. 4, fluid scraper units 20 are spring-mounted and held in the prescribed manner against the inner surface of roll sleeve 12, they may be ineffective when anti-deflection roll 10 is utilized as a bottom roll. When utilized as a bottom roll, the rotational direction of roll sleeve 12 reverses in respect to the direction when used as a top roll. Thus, anti-deflection roll 10 may therefore be utilized as a top roll and as a bottom roll. As a bottom roll, support units 16 may themselves act as the scraper units.

The solid and dashed lines shown in FIG. 4 may also illustrate two different positions of fluid scraper unit 20 that may result due to displacement of roll sleeve 12 relative to support member 14.

Instead of one uniform, axially arranged row of fluid scraper units 20, two uniform, axially arranged rows of fluid scraper units 20 are may be positioned within roll sleeve 12. Fluid scraper units 20 of each row may have their inclined planes 28 arranged differently. Thus, only one row of fluid scraper units 20 may be effective for each rotational direction of roll sleeve 12. This particular arrangement of two rows of fluid scraper units 20 may be advantageous when anti-deflection roll 10 is utilized as a top roll for two sister machines in mirror-inverted arrangement. The two rows of fluid scraper units 20 may be advantageously arranged on opposite sides of support member 14.

Figure 5:
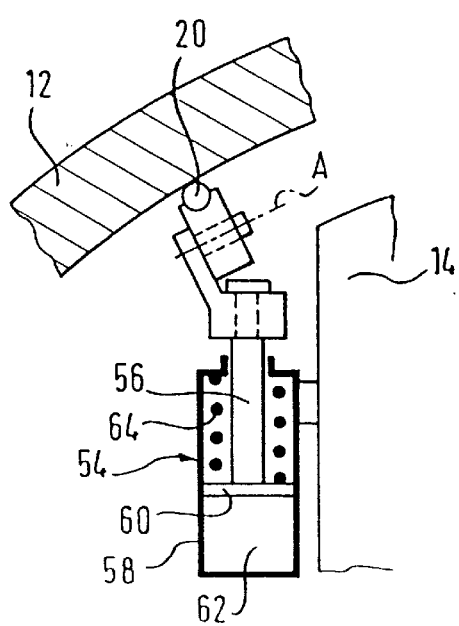
FIG. 5 illustrates another alternative embodiment of a fluid scraper unit utilizing a corresponding cylinder/piston unit.

FIG. 5 shows another alternative embodiment of fluid scraper unit 20 having a fitted piston/cylinder unit 54 for pressing the scraper against the inner surface of roll sleeve 12. Fluid scraper unit 20 may be mounted such that it may pivot around an axis A, most or all of which runs in a direction of the circumference. An outer end of a piston rod 56 may carry fluid scraper unit 20 and an inner end of piston rod 56 may be coupled to a piston 60 positioned within cylinder 58. Cylinder 58 may be rigidly mounted on support member 14. Piston 60 may be pressurized by a lower pressure chamber 62 of cylinder 58 to press fluid scraper unit 20 against the inner surface of roll sleeve 12 via movement of piston rod 56.

A pressure spring 64 may be coaxially positioned around piston rod 56 and located within cylinder chamber 58 above piston 60. Pressure spring 64 may be supported by piston 60 at one end and by an upper front face of cylinder 58, that allows piston rod 56 to pass therethrough, at an opposite end.

In case the pressurization should fail, fluid scraper unit 20 may be reset by pressure spring 64 to a home position, i.e., where it may be sufficiently distant from the inner surface of roll sleeve 12.

Fluid scraper unit 20 according to this alternative embodiment may be particularly suited for external control. If required, a force that presses fluid scraper unit 20 against the inner surface of roll sleeve 12 may also be easily adjusted and varied.

If, for example, anti-deflection roll 10 is utilized as a top roll, fluid scraper units 20 may be automatically actuated. That is, the respective pressure chambers 62 may be pressurized with appropriate hydraulic fluid to press fluid scraper units 20 onto roll sleeve 12 against the force of pressure springs 64. If, however, anti-deflection roll 10 is used as a bottom roll, fluid scraper units 20 may remain ineffective. That is, pressure chambers 62 simply remain or are rendered depressurized. Pressure springs 64 ensure that fluid scraper units 20 are held a sufficient distance from the inner surface of roll sleeve 12.

Figure 7:
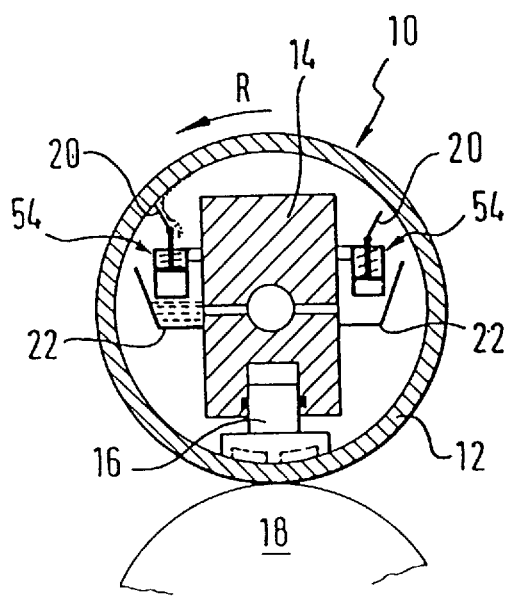
FIG. 7 illustrates a schematic sectional view, comparable to FIG. 1, displaying a top roll with two rows of fluid scraper units in which only the fluid scrapers on the left are effective when the roll sleeves turns in the indicated direction.
Figure 8:
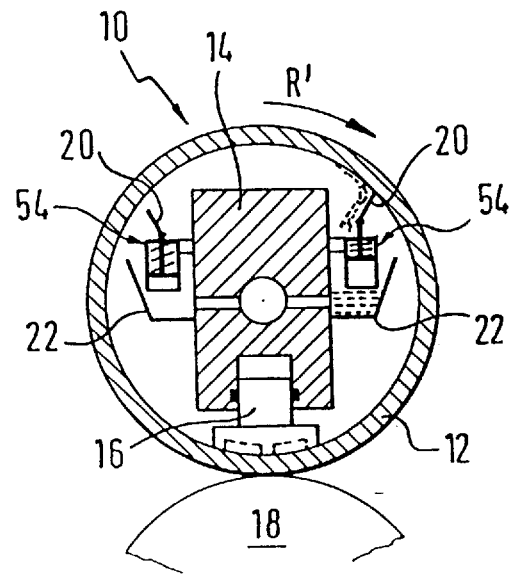
FIG. 8 shows the top roll in FIG. 7 in which only the fluid scrapers on the right are active when the roll sleeve turns in the opposite direction as that shown in FIG. 7.

As shown in FIGS. 7 and 8, two uniform, axially arranged rows of fluid scraper units 20 may be installed instead of one. The two rows of fluid scraper units 20 may be mounted on opposite sides of support member 14. At least one fluid reservoir 22 may be associated with row of fluid scraper units 20, and may lie beneath them to remove the fluid with the aid of gravity.

Anti-deflection rolls 10 illustrated in FIGS. 7 and 8 are arranged as top rolls that work in conjunction with bottom roll 18 to form a press gap or nip. The illustrated embodiments of FIGS. 7 and 8 are substantially mirror-inverted versions of each other. Thus, as roll sleeve 12 rotates in direction R, i.e., counterclockwise in FIG. 7, while roll sleeve 12 rotates in the opposite direction R', i.e., clockwise in FIG. 8.

As shown in FIG. 7, only a left row of fluid scraper units 20 is positioned to scrape fluid from the inner surface of roll sleeve 12. To effectuate this embodiment, the assigned cylinder/piston units 54 may be pressurized such that fluid scraper units 20 may be pressed against the force of the readjusting springs to abut the inner surface of roll sleeve 12. However, fluid scraper units 20 disposed on the right side of support member 14 in FIG. 7 remain ineffective because the corresponding cylinder piston units 54 is not pressurized. Thus, the right side fluid scraper units 20 may be held by the readjusting springs in a home position to maintain a sufficient distance from the inner surface of roll sleeve 12.

When the rotational direction of roll sleeve 12 is changed, i.e., reversed to direction R' shown in FIG. 8, roll sleeve 12 may turn clockwise. Accordingly, the cylinder/piston units 54 of the right row of fluid scraper units 20 may be pressurized so that the fluid is scraped from the inner surface of roll sleeve 12 by fluid scraper units 20.

However, the left fluid scraper units 20 of antideflection roll 10, are rendered ineffective due to the rotational direction R'. In this rotational direction, the cylinder/piston units 54 are not pressurized. Thus, fluid scraper units 20 may be maintain by the readjusting springs in the home position to likewise maintain a sufficient distance from the inner surface of roll sleeve 12.

Thus, a same anti-deflection roll 10 may be used for both configurations depicted in FIGS. 7 and 8. Thus, for this particular embodiment, only a different control for fluid scraper units 20 may be required. Further, the contact pressure may also be controlled externally.

Figure 6:
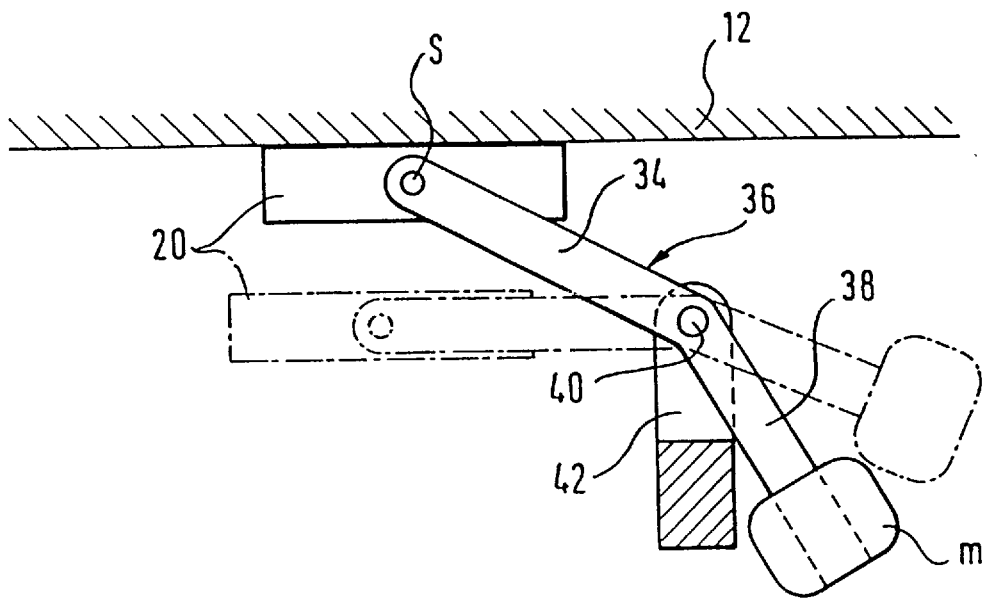
FIG. 6 illustrates yet another alternative embodiment of a fluid scraper unit using with gravity-assisted pressure on the inner surface of the roll sleeve.

FIG. 6 shows still another alternative embodiment of fluid scraper unit 20 that may be mounted on an arm 34 of a two-armed lever 36 and that may be pressed against the inner surface of roll sleeve 12 by gravity acting on an other lever arm 38 disposed opposite arm 34.

The two-armed lever 36 may be mounted through a pivot joint 40 of a support arm 42 coupled to support element 14 In contrast to the embodiment of FIG. 3, the axis of rotation defined by joint 40 in this embodiment is not arranged to run parallel to the roll axis, but rather substantially perpendicular to the roll axis.

In addition, fluid scraper unit 20 may include a bladelike shape that may be pivotally mounted on lever arm 34 to pivot around a rotation axis S. The corresponding rotation axis S may also be substantially perpendicular to the roll axis, and substantially parallel to rotational axis 40, i.e., substantially parallel to a tangent to the circumference.

A free end of the lever arm 38 may be equipped with a mass m to facilitate a most optimal gravity-assisted contact pressure.

The solid and dashed lines of FIG. 6 illustrate two different rotational positions of the lever 36 that may result from different positions of roll sleeve 12 relative to support element. In both rotational positions of lever 36, fluid scraper unit 20 may rests completely on, i.e., be in substantially flush contact with, the inner surface of roll sleeve 12. The flush contact is facilitated by the rotatable mounting of fluid scraper unit 20 on lever arm 34, which is likewise mounted to pivot around axis S.

By utilizing anti-deflection roll as a top roll, mass m on arm 38 will cause fluid scraper unit 20 to be pressed against the inner surface of roll sleeve 12 through a corresponding rotation of lever 36. When utilized as a bottom roll, lever 36 may rotated, i.e., also due to mass m, to withdraw fluid scraper unit 20 from the inner surface of roll sleeve 12 to maintain a sufficient distance, e.g., approximately 40 mm from the inner surface of the roll sleeve 12.

It is noted that the foregoing examples have been provided merely for the purpose of explanation and are in no way to be construed as limiting of the present invention. While the invention has been described with reference to a preferred embodiment, it is understood that the words which have been used herein are words of description and illustration, rather than words of limitation. Changes may be made, within the purview of the appended claims, as presently stated and as amended, without departing from the scope and spirit of the invention in its aspects. Although the invention has been described herein with reference to particular means, materials and embodiments, the invention is not intended to be limited to the particulars disclosed herein; rather, the invention extends to all functionally equivalent structures, methods and uses, such as are within the scope of the appended claims.

REFERENCE LIST 10 anti-deflection roll
12 roll sleeve
14 yoke
16 support units
18 bottom roll
20 fluid scraper units
22 fluid uptake
24 hydrostatic pockets
26 pressure chamber
28 inclined plane
30 channel
32 channel
34 lever arm
36 lever
38 lever arm
40 joint
42 support unit
44 ram
46 guide bush
48 bottom
50 pressure spring
52 attachment
54 cylinder/piston unit
56 piston rod
58 cylinder
60 piston
62 pressure chamber
64 pressure spring
a distance/spacing
b distance/spacing
l axial length
m mass
A axis
B axis
G gravity
P pressure plane
R direction
R' direction
T spacing/separation

What is claimed is:

1. An anti-deflection roll comprising:
  a rotating roll sleeve having a rotational axis;
  a support member extending through the rotating roll sleeve and supporting the rotating roll sleeve;
  a plurality of support elements, arranged along the support member in a spaced relation to form gaps between adjacent support elements and arranged substantially parallel to the rotational axis of the rotating roll sleeve, comprising one of hydrostatic and hydrodynamic support elements;
  an intermediate fluid coating layer disposed between each support element and an inner surface of the rotating roll sleeve; and
  a plurality of fluid scraper units positioned adjacent the inner surface of the rotating roll sleeve and extending along an axial extent of the rotating roll sleeve; and
  each of the plurality of fluid scraper units being aligned with the gaps formed between adjacent support elements.

2. The anti-deflection roll according to claim 1, further comprising a first and second end fluid scraper unit;
  the first end fluid scraper unit positioned between a first axial end of the roll sleeve and a first adjacent support unit; and
  the second end fluid scraper unit positioned between a second axial end of the roll sleeve and a second adjacent support unit.

3. The anti-deflection roll according to claim 1, further comprising:
  a predetermined space formed between adjacent fluid scraper units having a first distance;
  the gaps formed between adjacent support elements having a second distance; and
  the first and second distance being a same distance.

4. The anti-deflection roll according to claim 1, each fluid scraper unit comprising an axial length, the axial length being at least equal to a distance of the gaps formed between adjacent support units.

5. The anti-deflection roll according to claim 1,
  each fluid scraper unit being displaced, with respect to the support units, by one-half a spacing between respective centers of adjacent support units; and
  an axial length of each fluid scraper unit comprising a distance at least equal to a distance of the gaps formed between adjacent support units.

6. The anti-deflection roll according to claim 5,
  the axial length of each fluid scraper unit comprising a distance of approximately one third of the spacing between the respective centers of adjacent support units.

7. The anti-deflection roll according to claim 1, the fluid scraper units being at least one of at least partially arranged, shaped and pressurized to allow a fluid film having a thickness of between approximately 10 to 100 $\mu$m to pass through.

8. The anti-deflection roll according to claim 1, the fluid scraper units being at least one of at least partially arranged, shaped and pressurized to be actuated when the anti-deflection roll, arranged as a top roll, positions the fluid scraper units in an upper portion of the rotating roll sleeve, and to be deactivated when the anti-deflection roll, arranged as a bottom roll, positions the fluid scraper units in a lower portion of the rotating roll sleeve.

9. The anti-deflection roll according to claim 1, the fluid scraper units being at least one of at least partially arranged, shaped and pressurized to be actuated only when the rotating roll sleeve rotates in a first direction, and to be deactivated when the rotating roll sleeve rotates in a second direction that is opposite the first direction.

10. The anti-deflection roll according to claim 1, the plurality of fluid scraper units comprising a first and second uniform and axially arranged rows of fluid scraper units;
  the fluid scraper units being at least one of arranged, shaped and pressurized such that the first row of fluid scraper units is only effective when the rotating roll sleeve rotates in a first direction and the second row of fluid scraper units is only effective when the rotating roll sleeve rotates in a second direction that is opposite the first direction.

11. The anti-deflection roll according to claim 1, the fluid scraper units being at least one of at least partially arranged, shaped and pressurized to be effective in a first direction of rotation for the rotating roll sleeve and in a second direction opposite the first direction.

12. The anti-deflection roll according to claim 1, the fluid scraper units associated with at least one fluid reservoir effecting gravity-assisted fluid removal.

13. The anti-deflection roll according to claim 1, further comprising a two-armed lever;

at least one of the plurality of fluid scraper units mounted on a first arm of the two-armed lever;

the two-armed lever selectably pressing the at least one fluid scraper unit against the inner surface of the roll sleeve or holding, at a distance, the at least one fluid scraper unit from the inner surface of the roll sleeve.

14. The anti-deflection roll according to claim 13, the two-armed lever selectably pressing or holding the at least one fluid scraper unit according to a mounting position of the anti-deflection roll and to a force of gravity exerted on a second arm of the two-armed lever.

15. The anti-deflection roll according to claim 1, at least one of the fluid scraper units comprising a spring to pressed the fluid scraper against the inner surface of the roll sleeve by a predetermined spring force.

16. An anti-deflection roll according to claim 1, at least one of the plurality of fluid scraper units positioned to form a V-shaped groove with the inner surface of the roll sleeve; and the at least one of the plurality of fluid scraper units being effective for scraping fluid only when the roll sleeve rotates in a first direction and for allowing fluid to pass by the at least one scraper due to a hydrodynamic effect caused by formed groove when the roll sleeve rotates in a second direction that is opposite the first direction.

17. The anti-deflection roll according to claim 1, at least one of the plurality of fluid scraper units comprising a cylinder/piston unit for pressing the at least one fluid scraper unit against the inner surface of the roll sleeve; and the cylinder/piston unit comprising a spring for resetting the at least one fluid scraper unit to a home position, a predetermined distance from the inner surface, by a predetermined spring force of the spring.

18. An anti-deflection roll comprising:

a support member comprising a plurality of support devices;

a roll sleeve having a rotational axis rotatably supported by the plurality of support devices;

the plurality of support devices being spaced to form a gap having a predetermined gap distance between adjacent support devices and arranged substantially parallel to the rotational axis; and a plurality of fluid scraping devices positioned adjacent to an inner surface of the roll sleeve, each fluid scraping device being circumferentially spaced from the support devices and associated with a respective gap between adjacent support devices.

19. The anti-deflection roll according to claim 18, each fluid scraping device comprising a length greater than or equal to the gap distance.

20. The anti-deflection roll according to claim 18, further comprising a fluid reservoir for receiving the fluid from the fluid scraping device;

a central channel formed in the support member and coupled to a fluid drain; and a fluid channel coupling the reservoir and the central channel.

21. The anti-deflection roll according to claim 18, each fluid scraping device being arranged such that rotation of the roll sleeve in a first direction enables scraping of the fluid from the inner surface of the roll sleeve and that rotation of the roll sleeve in a second direction disables scraping of the fluid.

22. The anti-deflection roll according to claim 18, at least one fluid scraping device coupled to a lever having a first and second arm;

the first arm coupled to the at least one fluid scraping device;

the second arm biasing the at least one fluid scraping device toward the inner surface when the second arm is positioned below the first arm; and the second arm biasing the at least one fluid scraping device to a predetermined distance from the inner surface when the second arm is positioned above the first arm.

23. The anti-deflection roll according to claim 22, the lever rotating about a pivot substantially parallel to the rotational axis.

24. The anti-deflection roll according to claim 22, the lever rotating about a pivot substantially perpendicular to the rotational axis.

25. The anti-deflection roll according to claim 18, at least one fluid scraping device coupled to a rod biased by a spring; and the spring exerting a predetermined spring force on the at least one fluid scraping device to position the at least one scraping device adjacent the the inner surface.

26. The anti-deflection roll according to claim 18, at least one fluid scraping device coupled to a piston/cylinder device for biasing the at least one scraper device adjacent the inner surface.

27. The anti-deflection roll according to claim 26, the cylinder/piston device further comprising a spring for exerting a predetermined spring force opposing the actuation of the piston.

28. The anti-deflection roll according to claim 18, the plurality of fluid scraping devices comprising a first and second row of fluid scraping devices arranged substantially parallel to the rotational axis.

29. The anti-deflection roll according to claim 28, the fluid scraping devices associated with the first row are actuated by rotation of the roll sleeve in a first direction; and the fluid scraping device associated with the second row are actuated by rotation of the roll sleeve in a second direction.

* * * * *